(12) United States Patent
Carruthers

(10) Patent No.: US 7,904,352 B2
(45) Date of Patent: Mar. 8, 2011

(54) METHOD AND SYSTEM FOR MANAGING MATERIAL MOVEMENT AND INVENTORY

(75) Inventor: Cathie Carruthers, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 789 days.

(21) Appl. No.: 11/357,574

(22) Filed: Feb. 17, 2006

(65) Prior Publication Data

US 2007/0198313 A1    Aug. 23, 2007

(51) Int. Cl.
*G07B 17/00*    (2006.01)
*G06Q 20/00*    (2006.01)

(52) U.S. Cl. .............................................. 705/30; 705/16

(58) Field of Classification Search ................ 705/30
See application file for complete search history.

(56) References Cited

U.S. PATENT DOCUMENTS

| | | | |
|---|---|---|---|
| 5,305,199 A | 4/1994 | LoBiondo et al. | 364/403 |
| 5,450,317 A * | 9/1995 | Lu et al. | 705/10 |
| 5,946,662 A | 8/1999 | Ettl et al. | 705/8 |
| 6,058,375 A * | 5/2000 | Park | 705/30 |
| 6,266,493 B1 | 7/2001 | Farrell et al. | 399/24 |
| 6,341,266 B1 | 1/2002 | Braun | 705/7 |
| 6,405,178 B1 | 6/2002 | Manchala et al. | 705/29 |
| 6,567,824 B2 | 5/2003 | Fox | 7/104.1 |
| 6,577,304 B1 | 6/2003 | Yablonski et al. | 345/419 |
| 6,665,571 B2 | 12/2003 | Kiyohara et al. | 700/99 |
| 6,671,673 B1 | 12/2003 | Baseman et al. | 705/7 |
| 6,681,141 B2 | 1/2004 | Ferreri et al. | 700/106 |
| 6,876,980 B2 | 4/2005 | Reid et al. | 705/28 |
| 6,937,992 B1 * | 8/2005 | Benda et al. | 705/7 |
| 2004/0215563 A1 * | 10/2004 | Luo et al. | 705/40 |

OTHER PUBLICATIONS

Kerstin Gustafsson, Gunilla Jönson, David Smith, Leigh Sparks. Retailing Logistics and Fresh Food Packaging : Managing Change in the Supply Chain. London: 2006. p. 39, 29 pgs.*

* cited by examiner

*Primary Examiner* — Matthew S Gart
*Assistant Examiner* — Garcia Ade
(74) *Attorney, Agent, or Firm* — Alix, Yale & Ristas, LLP

(57) ABSTRACT

A method is provided that involves entering input data into a computer program including at least one of item number, manufacturing cost, material demand, supplier site, shipping frequency, transit time, and container cost, determining material management costs for a plurality of shipment options, and outputting from the computer program at least one of a first set of material management data based on the input shipping frequency and at least one of a second set of material management data based on an optimized shipping frequency of full inbound containers. A corresponding system is also disclosed. The method and system are useful for managing material movement and inventory.

14 Claims, 5 Drawing Sheets

120 — To: FIG. 3B

| | COST SUMMARY FOR SUPPLIER SITE |
|---|---|
| THE BUSINESS DAYS BETWEEN SHIPMENTS. (ASSUMES SHIPMENTS INTO 1 FULFILLMENT SITE AND THEN ALLOCATED TO THE 2nd FULFILLMENT SITE.) | 2.0 |

| COST/PIECE | FULFILLMENT SITE 1 |
|---|---|
| THEORETICAL | $4.09 |
| SUPPLIER INBOUND TO FULFILLMENT SITE 1 SCENARIO | $8.97 |
| SUPPLIER INBOUND TO FULFILLMENT SITE 2 SCENARIO | 126 |

123 —

| | SUPPLIER INBOUND TO FULFILLMENT SITE 1 AND ALLOCATED TO FULFILLMENT SITE 2 |
|---|---|
| 1. INVENTORY CARRYING COSTS | $13,000 |
| 1a. RAW INVENTORY VALUE | $130,000 |
| 2. INBOUND TRANSPORTATION | $400,000 |
| 3. FULFILLMENT SITE RECEIVING - FROM SUPPLIER | $2,000 |
| 4. FULFILLMENT SITE SHIPPING DOCK PROCESSING | $500 |
| 5. OUTBOUND TRANSPORTATION FROM 1st FULFILLMENT SITE TO THE 2nd FULFILLMENT SITE | $40,000 |
| 6. RECEIVING AT THE 2nd FULFILLMENT SITE | $1,000 |
| TOTAL COSTS P/(L)-ANNUAL | $456,500 |

130 —

| RECOMMENDED SCENARIO | |
|---|---|
| | YES |
| APPROVED (mark with an X) DATE | |

*FIG. 3A*

From: FIG. 3A

| 1P1 ABC CITY D | ~121 |

| DAYS | ~122 |

| FULFILLMENT SITE 2 |
| $4.48 |
| |
| $9.83 |

| SUPPLIER INBOUND TO FULFILLMENT SITE 2 AND ALLOCATED TO FULFILLMENT SITE 1 (128) | SUPPLIER DIRECT TO EACH FULFILLMENT SITE (MINIMIZES TRANSPORTATION SPEND-SEE NOTE BELOW ON WAY TO ATTAIN)[1] (124) |
| --- | --- |
| $20,000 | $12,500 |
| $200,000 | $125,000 |
| $430,000 | $190,000 |
| $3,000 | $2,500 |
| $2,500 | $0 |
| $150,000 | $0 |
| $2,000 | $0 |
| $607,500 | $205,000 |

| NO |

[1] THE SUPPLIER DIRECT COST ASSUMES THAT THE SUPPLIER CAN SHIP FULL LOADS DIRECTLY TO EACH FULFILLMENT SITE AT THE SHIPMENT FREQUENCY REQUESTED.

*FIG. 3B*

METHOD AND SYSTEM FOR MANAGING MATERIAL MOVEMENT AND INVENTORY

BACKGROUND

The embodiments disclosed herein relate to the management of material movement and inventory, and more particularly to a method and system for efficiently transporting and warehousing large quantities of material.

It is known to make material sourcing decisions based initially or primarily upon unit manufacturing cost. In such cases, one department selects a supplier based on manufacturing costs and then another department is responsible for arranging economical and timely shipping. However, in the current economic climate in which many goods are manufactured overseas, the transportation costs can be a large percentage of the overall acquisition cost. Furthermore, the proper timing of shipments is important given the longer lead time required for long distance shipping.

Various systems have been developed to optimize acquisition and/or movement costs for large quantities of goods. U.S. Pat. No. 5,450,317 discloses a logistics planning method and system for recommending optimal order quantities and timing, choice of vendor locations and storage locations, and transportation modes, for individual items and product families. Four different databases are accessed to provide forecasts of customer demand, warehouse demand, and transportation costs. A dynamic programming model is used to determine order and shipment solutions, including optimized selection of the supplier, routing, order timing, and order quantity.

U.S. Pat. No. 6,341,266 is directed to a method and system for managing inventory in a multiple level distribution chain. The system is designed to minimize transportation costs, avoid bottlenecks, and prioritize demands if a bottleneck occurs. The method involves initializing a range of coverage profile with a starting value, computing the inflows necessary to fulfill the profile constraints, constructing the cheapest flow for these demands, and then lowering or enlarging the range of coverage profiles until a solution is found.

The systems disclosed in U.S. Pat. Nos. 5,450,317 and 6,341,266 rely heavily upon computerized algorithms that use input data to generate a comprehensive output solution. From a practical standpoint, however, users of such planning systems may not always be kept up-to-date with pertinent input data and options. Employee turnover may require the time-consuming training of new users of these programs. Furthermore, certain important variables involved in planning, shipping, etc. may not be readily quantified for use as input data. Thus, known systems for selecting and shipping material may not necessarily optimize the overall process of acquiring, shipping and warehousing material. It would be useful to develop a simple and practical system and method for managing material movement and inventory that relies upon both computer-generated estimates and input from other knowledgeable sources.

SUMMARY

One embodiment is a method comprising entering input data into a computer program including at least one of item number, manufacturing cost, material demand, supplier site, shipping frequency, transit time, and container cost, determining material management costs for a plurality of shipment options, and outputting from the computer program at least one of a first set of material management data based on the input shipping frequency and at least one of a second set of material management data based on an optimized shipping frequency of full inbound containers.

In some embodiments, a first part of the first set and/or second set of material management data assumes that the full inbound containers are sent to a first location and a portion of material in the full inbound containers subsequently is transferred to a second location. Sometimes, a second part of the first set and/or second set of material management data assumes that full inbound containers are sent to the second location and a portion of material in the full inbound containers subsequently is transferred to the first location. In certain cases, a third part of the first set and/or second set of material management data assumes that full inbound containers are sent from the supplier site directly to both a first location and a second location. The method sometimes involves selecting a shipping method based upon review of the first and second sets of material management data.

Determination of the second set of material management data usually assumes that the full inbound containers are either mixed or unmixed containers. Sometimes, determination of the first and second sets of material management data assumes that the full inbound containers originate with a single supplier.

In certain cases, the method involves, before determining material management costs, entering standard data including inventory carrying costs. Often, a portion of the input data is imported from a transportation cost database and/or a historical shipment database. The first and second sets of material management data usually are reviewed by an inventory planner and a transportation analyst.

Another embodiment is a system comprising a computer having a memory containing standard data, a processor configured to determine material management costs for a plurality of shipment options, and software that generates an input form configured to receive material management data for an item to be shipped and an output form that provides at least one of a first set of material management data based on a preferred shipping frequency and at least one of a second set of material management data based on an optimized shipping frequency of full inbound containers.

In some cases, the processor determines a first part of the first set of material management data using an assumption that full inbound containers are sent to a first location and a portion of material in the full inbound containers subsequently is sent to a second location. In certain cases, the processor determines a second part of the first set of material management data using an assumption that full inbound containers are sent to a second location and a portion of material in the full inbound containers subsequently is sent to the first location.

Yet another embodiment is a method comprising entering input data into a computer program including item number, manufacturing cost, material demand, supplier site, shipping frequency, transit time, and container cost, determining material management costs for a plurality of shipment options involving shipping containers of material to a first location and subsequently shipping a portion of the material to a second location, outputting from the computer program a first set of material management data based on the input shipping frequency and a second set of material management data based on an optimized shipping frequency of full inbound containers, and selecting a shipping method based upon review of the first and second sets of material management data. The material management costs are often determined based on an assumption that full containers are shipped.

BRIEF DESCRIPTION OF THE DRAWINGS

FIGS. 3A and 3B show an example of an output sheet providing the system user with overall costs using a specified shipping frequency.

DETAILED DESCRIPTION

Figure 1:
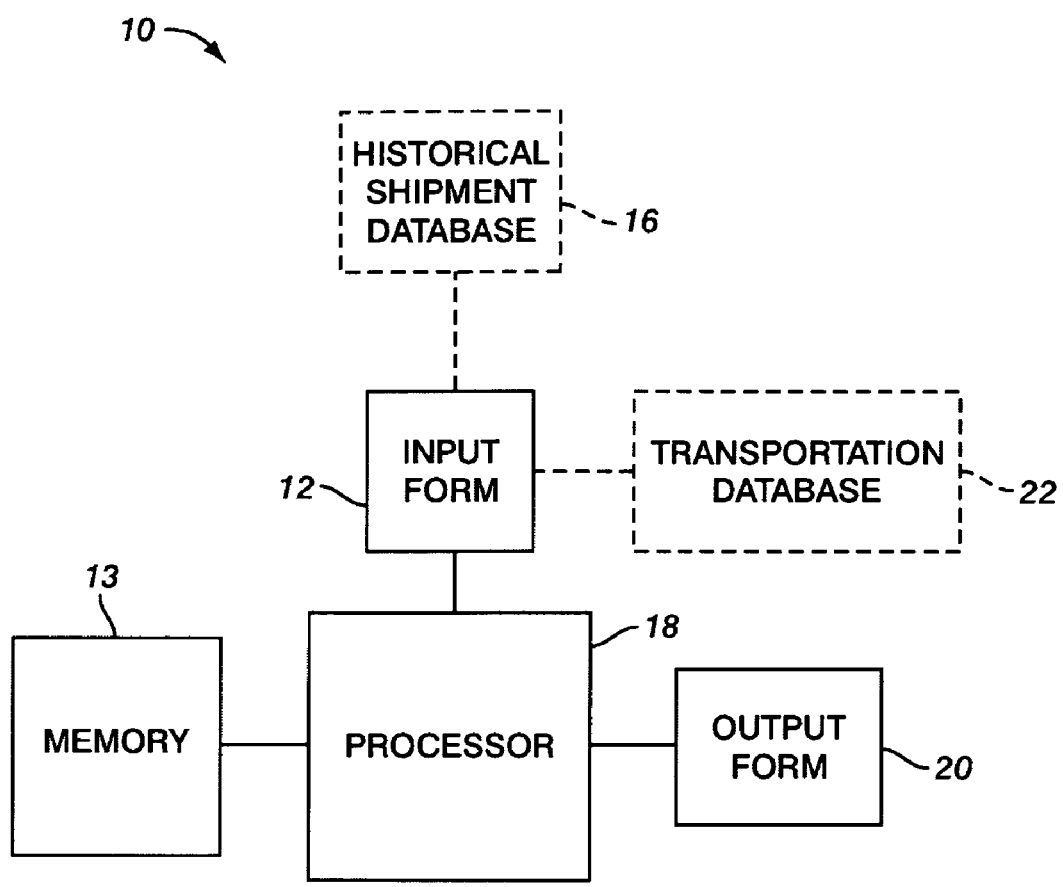
FIG. 1 schematically shows the system disclosed herein.

The embodiments disclosed herein employ a practical technique to determine the most cost-effective way to bring in and stock materials at distribution sites. The method analyzes costs of transportation, warehouse processing and inventory. The transportation costs and transit time are taken into account up-front, thereby enabling global purchasers and/or planners to understand the potential impact of their sourcing and shipping decisions and change these decisions, if necessary, to reduce costs while meeting inventory requirements. The solutions proposed herein are simple enough to allow for efficient training of planners and system operators, and in some embodiments provide for employee knowledge-based input in addition to computerized analysis. In one embodiment, the system and method combines an international transportation cost and transit time database with a computer program that analyzes transportation and inventory costs on a part-by-part basis. In another embodiment, transportation and shipping costs are determined for two or more types of items being shipped from the same supplier site. In a further embodiment, transportation and shipping costs are determined for two or more types of items being shipped from the same port.

As used herein, the term "item number" refers to a designation of numbers and/or letters that identifies a particular type of item. "Manufacturing cost" refers to the cost to purchase an item exclusive of tax and shipping. "Material management cost" refers to the cost of transporting and warehousing the item. "Full inbound containers" are containers that are shipped from a supplier site to a warehouse or other fulfillment site at full capacity. In many cases, the supplier site is overseas relative to the destination. A "mixed" container contains more than one type of item and an "unmixed" container contains only a single type of item.

As used herein, "transit time" indicates the total transportation time from the supplier site to the warehouse or other fulfillment site. "Shipping frequency" refers to how often a shipment is made, and is usually expressed in terms of business days between shipments or number of shipments per year. "Container cost" is the price charged by the transportation carrier to move a container of a specified size, often a 20' or 40' container, from the supplier site to the warehouse or other fulfillment site. The "cost of capital" is the amount that an organization is required to pay for the capital used in financing its activities.

As used herein, an "inventory planner" is an individual who determines the quantities and types of inventory that are to be shipped to certain warehouses and the shipping times. A "transportation analyst" is an individual who determines how and when the inventory is transported to the warehouses or other fulfillment sites, such as distribution centers.

In the system and methods disclosed herein, material demand usually has been determined in an upstream process using forecasting software and/or order history data. One or more suitable suppliers are identified and a total cost analysis is run separately for each potential supplier and/or each port.

In general, for a selected supplier or for a comparison of several different potential suppliers, at least three scenarios are run for each supplier. The first is the cost of direct shipping to each warehouse or other destination at the input shipping frequency assuming full containers are shipped. The second scenario involves shipping a load to a first company warehouse and then shipping a portion of it onward to a second company warehouse at a preferred shipping frequency. In the third scenario, the shipping frequency is derived in order to optimize inbound transportation costs while providing that full containers are shipped. Shipping can be by one or more of ocean, air, and/or surface. By looking at multiple scenarios for each supplier, and, in some cases, at multiple suppliers, the inventory planner and transportation analyst can together determine which option is best from the standpoint of economic efficiency.

In many cases, the decision-makers also factor in their knowledge and experience in analyzing the numerical results. For example, when transportation costs are calculated on an item-by-item basis, knowledge about shipments of other materials from the same supplier site are useful in determining whether an assumption can be made that a particular type of material can be consolidated with other material and therefore transported in full, mixed containers. In other cases, the system will automatically combine different sets of items leaving from the same supplier site or the same port to form full, mixed containers.

Referring to the figures and first to FIG. 1, a system for optimizing material movement is shown. The system 10 includes a computerized input form 12 upon which a user enters input data including item number and/or type, manufacturing cost, material demand, supplier site, shipping cost from the supplier site to the selected fulfillment site, preferred shipping frequency, and transit time. Other data that is usually included is the inventory service level, which is the percentage of time for which there will be no stockouts at a particular warehouse, and a breakdown of the material demand allocated to each of two or more company warehouses on a monthly basis. This type of data typically is entered on the input form 12 by importing it from a historical shipment database 16, which may be connected to a forecasting system. When a new supplier is being considered, data usually is entered in response to prompts provided in a graphical user interface. A transportation database 22 containing transportation costs and transit times for different suppliers also can be included and information from this database can be imported into the input form 12.

The system 10 includes a memory 13 that contains standard company data. Non-limiting examples of standard company data included in the memory 13 are (1) inventory carrying costs such as the cost of acquiring and maintaining inventory, which typically is expressed as a percentage of inventory value, (2) container data such as the number of skids that will fill containers of certain sizes, (3) domestic transportation costs that typically include dollars per mile for a standard size trailer, (4) container costs, and (5) labor costs for loading and unloading materials at the company warehouses. Customization of the system for a particular company usually involves the entry of standard data into the memory 13 before the system is used. The standard data can then be updated at any time.

A processor 18 uses the standard data in the memory 13 along with the data entered on input-form 12 to calculate output, which is displayed on an output form 20. The information included on output form 20 comprises transportation and inventory cost summaries under the different scenarios described above.

Figure 2:
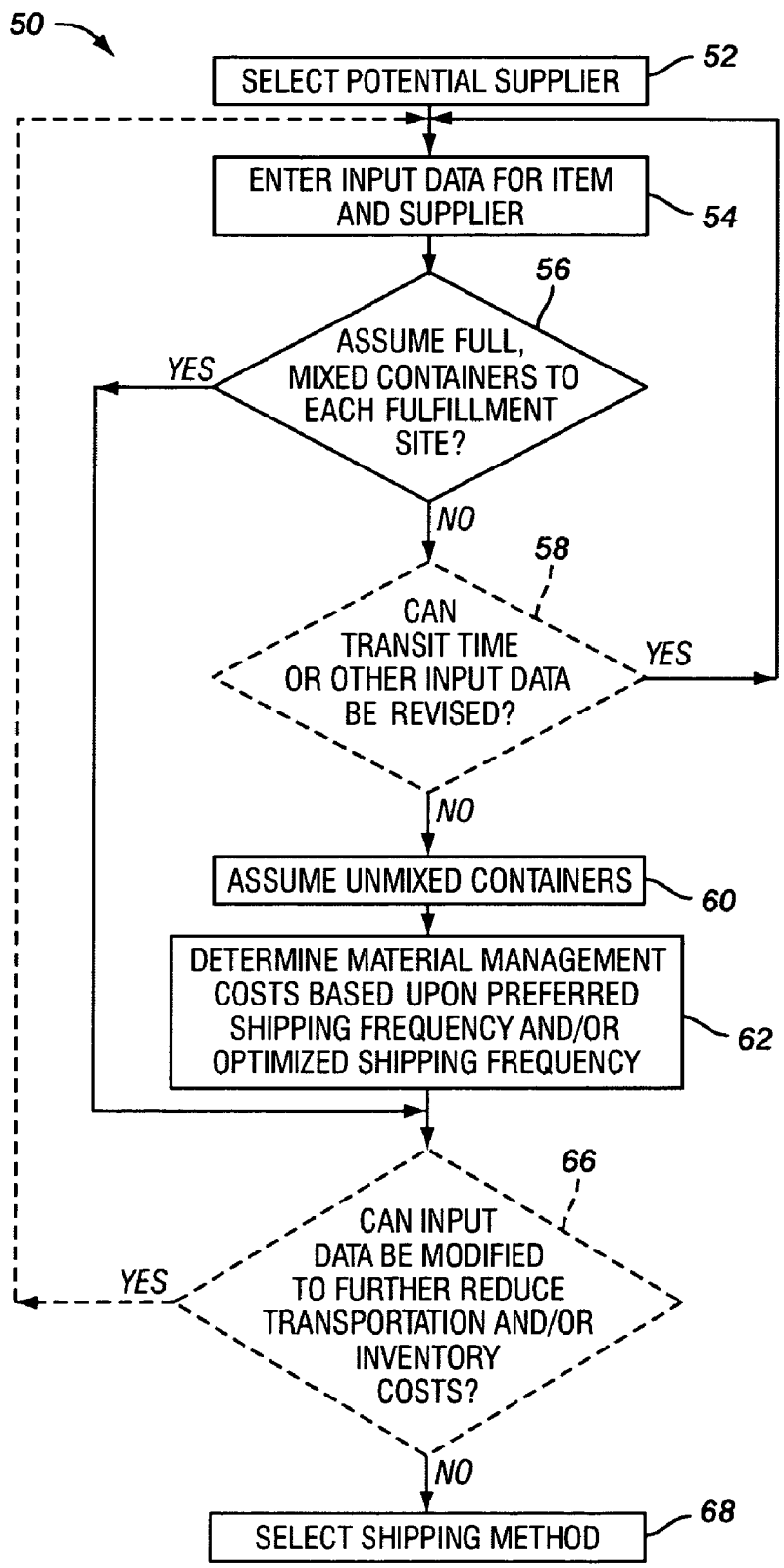
FIG. 2 is a flow sheet showing the method of an embodiment in which material is shipped to one or both of two central warehouses.

FIG. 2 is a flow chart 50 depicting a method of an embodiment in which a first output form provides transportation and inventory carrying costs at a preferred shipping frequency and a second output form provides transportation and inventory carrying costs using an optimized shipping frequency. This method assumes that the standard data has already been entered into the memory. The system user selects a potential supplier at 52. The user enters the input data including item numbers and/or types, material cost, material quantity, supplier site, shipping frequency, transit time, and container cost, at 54. Before, during or after entering the input data, the user determines at 56 whether the volume is sufficient that full loads of a single type of item can be shipped to each central warehouse. If so, the user proceeds with a determination of transportation costs under various scenarios, as will be described further below. If not, the user then determines at 56 whether there is a sufficient quantity of other material coming from the same supplier to justify using an assumption that full, mixed containers can be shipped to each fulfillment site. This determination typically is made by contacting a transportation planner to inquire as to what other material is being shipped from the same supplier.

If the shipping of full, unmixed or mixed loads to each fulfillment site cannot be assumed, the user may consider revising a portion of the input, such as by increasing the transit time, in order to increase load size at 58. In this case, the user returns to the input form and revises one or more of the values of the input data at 54 in an effort to improve shipping efficiency. If revisions to the input data are not practical, the user assumes the use of unmixed containers to a single fulfillment site at 60, and proceeds to determine transportation costs of unmixed containers to one fulfillment site with a portion of the load being subsequently transferred to the other fulfillment site.

Based upon the input data and the standard data, the processor 18 determines the material management costs using the preferred shipping frequency at 62 and also a calculated shipping frequency based upon optimal inbound transportation costs. More particularly, at 62, assuming that there are two central warehouses, all of the material will be shipped to one of the two warehouses and then the portion of the material intended for the other warehouse will be shipped (usually by truck) to the other warehouse. Usually, the processor is configured to determine the transportation cost at the preferred shipping frequency for one scenario in which the international shipping destination is the first warehouse, and another scenario in which the international shipping destination is the second warehouse. The processor 18 also or alternatively can be used to determine what the transportation costs would be if the shipping frequency were optimized. When shipping frequency is optimized, two scenarios typically are calculated, using each of two different fulfillment sites as the initial delivery site with a portion of the material being transferred to the other site.

Next, the user determines whether any of the shipment solutions set forth at 62 are acceptable. The user optionally determines whether any of the inputs can be further modified to further reduce transportation and inventory costs at 66 while meeting the necessary inventory requirements. If so, the user returns to the input sheet and revises the input data at 54 and runs the program again in order to find other shipping solutions. When the user is satisfied that they have found an economical shipping method, this shipping method is then selected at 68. In some cases, the shipping scheme to be implemented is approved by both a transportation analyst and an inventory planner.

Figure 4:
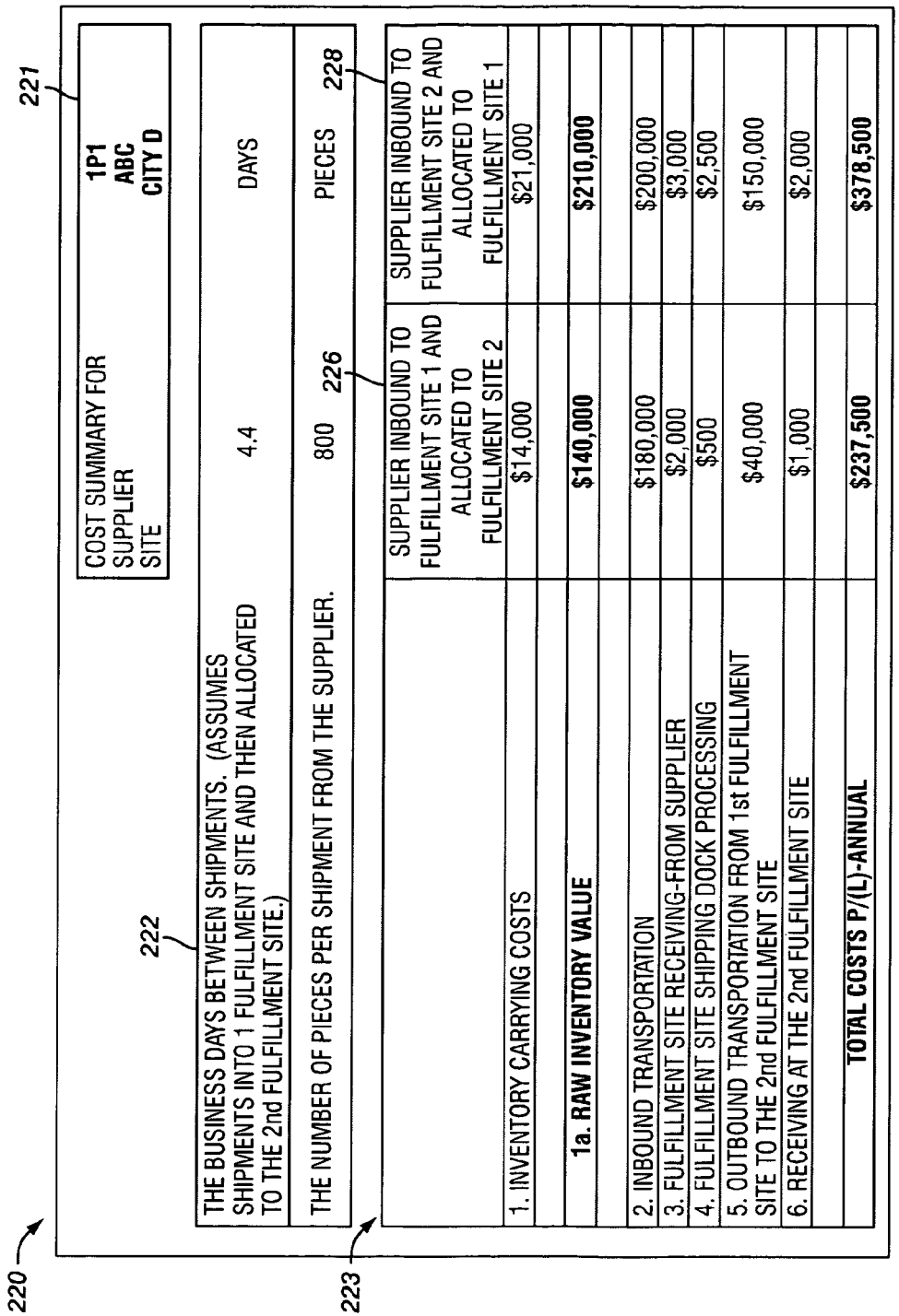
FIG. 4 shows an example of an output sheet providing the system user with overall costs using the most economical shipping frequency.

Examples of output sheets showing transportation costs are shown in FIGS. 3A, 3B and 4. FIGS. 3A and 3B show inventory and transportation costs at the user-selected shipping frequency into fulfillment site 1, fulfillment site 2, and directly into both of fulfillment sites 1 and 2. An output form 120 displays, in box 121, supplier name and location. Box 122 displays the number of business days between shipments that was input by the user, and the calculated inbound shipping cost per piece. Box 122 also includes the theoretical calculated inbound shipping cost per piece if full containers are shipped directly to each fulfillment site. The input value for business days between shipments in box 122 is used in the calculations for boxes 124, 126 and 128. The overall costs direct to the two fulfillment sites, assuming that shipments result in full containers, are displayed in box 124. Box 126 shows the calculated costs if shipments are sent directly from the supplier site to fulfillment site 1 and an appropriate portion of the shipment is then transferred to fulfillment site 2. Box 128 shows the calculated costs if shipments are sent directly to fulfillment site 2 and an appropriate portion of the shipment is then transferred to fulfillment site 1. Box 130 is used to mark which shipment scenario is selected, whether it has been approved, and the date of approval.

In FIG. 4, the displayed output on form 220 is based on an optimization of the cost of inbound transportation from the supplier site. Box 221 displays supplier name and location. The optimized (calculated) business days between shipments and the total number of pieces per shipment from the supplier in order to achieve the lowest inbound transportation costs to one fulfillment site with a subsequent partial shipment to the other fulfillment site are displayed in box 222. The costs involved in shipping directly to fulfillment site 1 are shown in box 226. The costs involved in shipping directly to fulfillment site 2 are shown in box 228. A determination as to which alternative has a lower cost will depend in part upon the locations of Warehouse 1 and Warehouse 2 relative to the supplier site and the fractional quantity of material destined for each of the two endpoints. Other factors may include turnaround time and labor rates at each of the warehouses.

Based upon the computerized output of various cost options, the final decision of the designated supplier as well as the transportation methods and shipment timing is determined. Typically, this decision occurs after both the transportation analyst and the inventory planners have reviewed both of output forms 120 and 220.

In another embodiment, several different types of items being shipped from the same supplier site are combined in the same set of input data and taken into account in generating output data. In this case, the input data at 54 will include multiple items and the assumption made at 60 will be that the containers may be mixed containers. In yet another embodiment, items from several different suppliers being shipped from the same port are combined in the same set of input data and are taken into account in generating output data. The input data at 54 will include multiple items and multiple suppliers, and the assumption made at 60 will be that the containers may be mixed containers.

The method and system disclosed herein are relatively simple to use, thereby enabling businesses to quickly and inexpensively train new employees to manage material movement and inventory. By not being overly reliant upon computerized analysis, the method and system allow the inventory planner and transportation manager to remain in touch with material management operations and in some cases require them to communicate with each other, thereby ensuring efficient material movement.

It will be appreciated that various of the above-disclosed and other features and functions, or alternatives thereof, may be desirably combined into many other different systems or applications. Various presently unforseen or unanticipated alternatives, modifications, variations, or improvements therein may be subsequently made by those skilled in the art which are also intended to be encompassed by the following claims. The claims can encompass embodiments in hardware, software, or a combination of both.

What is claimed is:

1. A method comprising:
    entering input data using a computer, the input data including shipping frequency and at least one of item number, manufacturing cost, material demand, supplier site, transit time, and container cost,
    determining material management costs for a plurality of shipment options using a processor, and
    outputting using a computer a first set of material management data based on the input shipping frequency and a second set of material management data based on an optimized shipping frequency of full inbound containers, the second set of material management data including a first part that assumes the full inbound containers are sent to a first location and a portion of material in the full inbound containers subsequently is transferred to a second location, and a second part that assumes the full inbound containers are sent to the second location and a portion of material in the full inbound containers subsequently is transferred to the first location, and
    selecting one of at least two alternative a shipping methods based upon review of the first and second sets of material management data output by the computer, wherein the shipping method is selected by a user of the computer.

2. The method of claim 1, wherein a first part of the first set of material management data assumes that full, mixed inbound containers are sent to a first location and a portion of material in the full, mixed inbound containers subsequently is transferred to a second location.

3. The method of claim 2, wherein a second part of the first set of material management data assumes that full, mixed inbound containers are sent to the second location and a portion of material in the full, mixed inbound containers subsequently is transferred to the first location.

4. The method of claim 1, wherein the second set of material management data includes a third part that assumes that full inbound containers are sent from the supplier site directly to both a first location and a second location.

5. The method of claim 3, wherein a third part of the first set of material management data assumes that full, mixed inbound containers are sent from the supplier site directly to both a first location and a second location.

6. The method of claim 1, wherein the second set of material management data is determined assuming that the full inbound containers are unmixed containers.

7. The method of claim 1, wherein the second set of material management data is determined assuming that the full inbound containers are mixed containers.

8. The method of claim 7, wherein the first and second sets of material management data are determined assuming that the full inbound containers originate with a single supplier.

9. The method of claim 1, further comprising, before determining material management costs, entering standard data including inventory carrying costs.

10. The method of claim 9, wherein inventory carrying costs include costs of capital.

11. The method of claim 1, wherein a portion of the input data is imported from at least one of a transportation cost database and a historical shipment database.

12. The method of claim 1, wherein the first and second sets of material management data are reviewed by an inventory planner and a transportation analyst.

13. A system comprising a computer having a memory containing standard data, a processor configured to determine material management costs for a plurality of shipment options, and software that generates an input form on a computer, the input form being configured to receive material management data for an item to be shipped, and an output form that provides a first set of material management data based on a preferred shipping frequency and a second set of material management data based on an optimized shipping frequency of full inbound containers,
    the second set of material management data including a first part that assumes the full inbound containers are sent to a first location and a portion of material in the full inbound containers subsequently is transferred to a second location, and a second part that assumes the full inbound containers are sent to the second location and a portion of material in the full inbound containers subsequently is transferred to the first location,
    the software further generating a selection box in which a user inputs data indicative of a selection of either a first shipment option based on the first set of material management data or a second shipment option based on the second set of material management data.

14. The system of claim 13, wherein the processor determines a first part of the first set of material management data using an assumption that full, mixed inbound containers are sent to a first location and a portion of material in the full, mixed inbound containers subsequently is sent to a second location, and a second part of the first set of material management data using an assumption that full, mixed inbound containers are sent to a second location and a portion of material in the full, mixed inbound containers subsequently is sent to the first location.

* * * * *